United States Patent [19]

Kanazashi et al.

[11] Patent Number: 4,612,850
[45] Date of Patent: Sep. 23, 1986

[54] BREWING APPARATUS

[75] Inventors: Takeshi Kanazashi, Kiriu; Toru Kanbe, Ota, both of Japan

[73] Assignee: Sanden Corporation, Isesaki, Japan

[21] Appl. No.: 721,939

[22] Filed: Apr. 11, 1985

[30] Foreign Application Priority Data

Apr. 16, 1984 [JP] Japan .............................. 59-56367[U]
Jul. 30, 1984 [JP] Japan ............................ 59-117072[U]
Aug. 30, 1984 [JP] Japan ............................ 59-130531[U]

[51] Int. Cl.[4] ............................................. A47J 31/34
[52] U.S. Cl. .................................. 99/289 R; 99/287; 99/302 R
[58] Field of Search ...................... 99/279, 287, 289 R, 99/289 T, 289 D, 289 P, 297, 300, 302 R, 302 P, 303, 307; 426/433

[56] References Cited

U.S. PATENT DOCUMENTS

| | | | |
|---|---|---|---|
| 3,143,058 | 8/1964 | Jannin | 99/289 |
| 3,349,690 | 10/1967 | Heier | 99/283 |
| 4,389,925 | 6/1983 | Piana | 99/289 R |
| 4,457,216 | 7/1984 | Dremmel | 99/289 R |
| 4,491,063 | 1/1985 | Grossi | 99/289 R |

Primary Examiner—Robert W. Jenkins
Attorney, Agent, or Firm—Banner, Birch, McKie & Beckett

[57] ABSTRACT

The brewing apparatus includes a vertically movable cylinder with an open top and bottom, a piston mounted for reciprocation down into such cylinder and a heated liquid supply discharging brewing liquid into the open top of the cylinder. A brewing cavity is horizontally reciprocable beneath the cylinder between a brewing position and a rest position. A ground beverage material supply delivers material into the brewing cavity when the cavity is disposed at a material supplying position located intermediate the brewing position and the rest position. A second heated liquid supply discharges liquid into the brewing cavity while the cavity is disposed at the material supplying position with an electromagnetic valve controlling the second liquid supply operation. The reciprocably mounted piston may be provided with an air pressure release to release compressed air from within the vertically movable cylinder. A drain structure disposed beneath the open bottom of the cylinder for collecting and delivering the brewing liquid to a cup has a funnel element placed beneath the open bottom of the drain structure to prevent scattering of brewing liquid.

6 Claims, 6 Drawing Figures

BREWING APPARATUS

BACKGROUND OF THE INVENTION

This invention relates to a beverage brewing apparatus, and more particularly, to apparatus for rapidly preparing cup size quantities of hot coffee or the like from a freshly ground charge of beverage material without variation in the quality of the beverage.

Beverage brewing apparatus for preparing single cup quantities of beverages from beverage material is well known in the prior art. For example, U.S. Pat. No. 3,349,690 issued to William Heier discloses one construction for such a brewing apparatus.

Referring to FIG. 1 on the application drawings, the basic construction and brewing cycle of a prior art apparatus will be described.

A frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of cam member 5 driven by motor 6. One end opening of a duct 7 is connected with water tank 8 through electromagnetic valve 9, this end opening being closely placed above the upper opening of cylinder 2 to supply hot water into cylinder 2. A brewing cavity 10 which is generally reciprocable horizontally between a brewing position D and a rest position A is placed beneath the cylinder 2 and sealed with the lower portion of cylinder 2 in the brewing position D.

The prior art apparatus is also provided with a coffee hopper 11 which has an outwardly flaring mouth 11a positioned to receive a charge of coffee from outlet spout 12a of canister 12. The ground coffee fills canister 12 which is provided with suitable feed means to deliver a predetermined quantity of fresh ground coffee into hopper 11 at a point prior to the start of the brew extracting operation.

In this apparatus, brewing cavity 10, at the start of a brewing cycle initiated by a coin operated switch for example, moves horizontally toward brewing position D from rest position A to a place beneath the bottom opening of cylinder 2. During this horizontal movement, the ground coffee is supplied into the brewing cavity 10 through coffee hopper 11 at the position indicated by "C" in FIG. 1. When brewing cavity 10 is properly aligned beneath the cylinder 2, due to the operation of cam member 5, cylinder 2 moves downwardly into tight engagement with cavity 10. This forms a chamber which is filled with hot water supplied through duct 7. Thereafter, piston 4 moves downwardly to force the water through filter member 3 into the ground coffee in cavity 10 and through an outlet conduct 13 to a cup 14 placed at a dispensing station. Thereafter, the brewing cavity 10 containing the spent coffee grounds is moved to its rest position A and the grounds in the brewing cavity 10 are thrown away at the ground dumping position which is reached before rest position A, this position being indicated by "B" in FIG. 1. When the brewing cavity 10 is returned to its rest position A, one brewing cycle has been completed.

During the brewing cycle, the brew extraction time of beverage within brewing cavity 10 is influenced by the desired strength of the brewed beverage, i.e., the extraction efficiency of the beverage material is dependent upon the brew extraction time. Therefore, several improvement ideas to improve the extraction efficiency are possible. The time of one brewing cycle could be extended or movement of the piston horizontally shifting cavity 10 may be temporarily stopped in a midway position of the brewing cycle. However, generally customers using the apparatus are unwilling to wait for service more than a few moments after they have deposited their coin.

In addition, as shown in FIG. 2, the prior art proposes that a seal element 15 be disposed on the outer peripheral portion of piston 4 to tightly seal between the outer peripheral surface of piston 4 and inner surface of cylinder 2. Thus, during the brewing cycle, the hot water filling cylinder 2 is easily and quickly passed through the ground coffee G in the brewing cavity 10. However, if piston 4 is moved quickly downwardly, the pressure within the interior of cylinder 2 which is defined between the inner surface of cylinder 2 and piston 4 is rapidly raised, thereby causing problems. That is, lip portion 15a of seal element 15 which normally contacts with the inner surface of cylinder 2 is spread out by the high pressure and strongly pushed against the inner surface of cylinder 2. This deformation of lip portion 15a is shown by dotted line in FIG. 2(b). Therefore, the rubbing force of seal element 15 against cylinder 2 is increased until finally seal element 15 becomes damaged. Also, large loads acting on piston 4 through seal element 15 finally detrimentally influence the operation of driving motor 6.

SUMMARY OF THE INVENTION

It is a primary object of this invention to provide a brewing apparatus which gives better performance of the brewing operation while still having a simple construction.

It is another object of this invention to provide a brewing apparatus which can have an extended brewing extraction time for the beverage without extending the overall time of the brewing cycle.

It is still another object of this invention to provide a brewing apparatus with a liquid scatter prevention device for eliminating scattering of the brewing drops due to sudden expansion of the compressed air and liquid leaving the brewing cavity.

A brewing apparatus according to this invention includes a frame and a vertically movable cylinder which is supported by the frame, this cylinder having an open top and an open bottom. A piston is reciprocably disposed within the cylinder. A brewing liquid supply means which has a discharge opening positioned to discharge brewing liquid into the open top of the cylinder is connected to a liquid heating tank in which a brewing liquid is stored. A brewing cavity is disposed beneath the cylinder to be horizontally reciprocable between a brewing position and a waiting position. This cavity is tightly engaged with the open bottom of the cylinder to form the brewing chamber when placed in the brewing position. The ground beverage material is supplied into the brewing cavity through ground material supply means when the brewing cavity is placed at the ground material supply position.

A second liquid supply means has a liquid discharge opening positioned to discharge predetermined quantities of liquid into the brewing cavity when the brewing cavity is placed at the ground material supply position. The second liquid supply means is connected to the liquid heating tank and control of the flow of liquid through this second liquid supply means is effected by an electromagnetic valve.

One aspect of this invention involves providing the piston with an air pressure relief device to release the air from the interior of the cylinder. Therefore, the brewing operation is smoothly performed without any problems.

Further objects, features and other aspects of this invention will be understood from the detailed description of the preferred embodiments of this invention while referring to the annexed drawings.

DETAILED DESCRIPTION OF THE PREFERRED EMBODIMENTS

Figure 3:
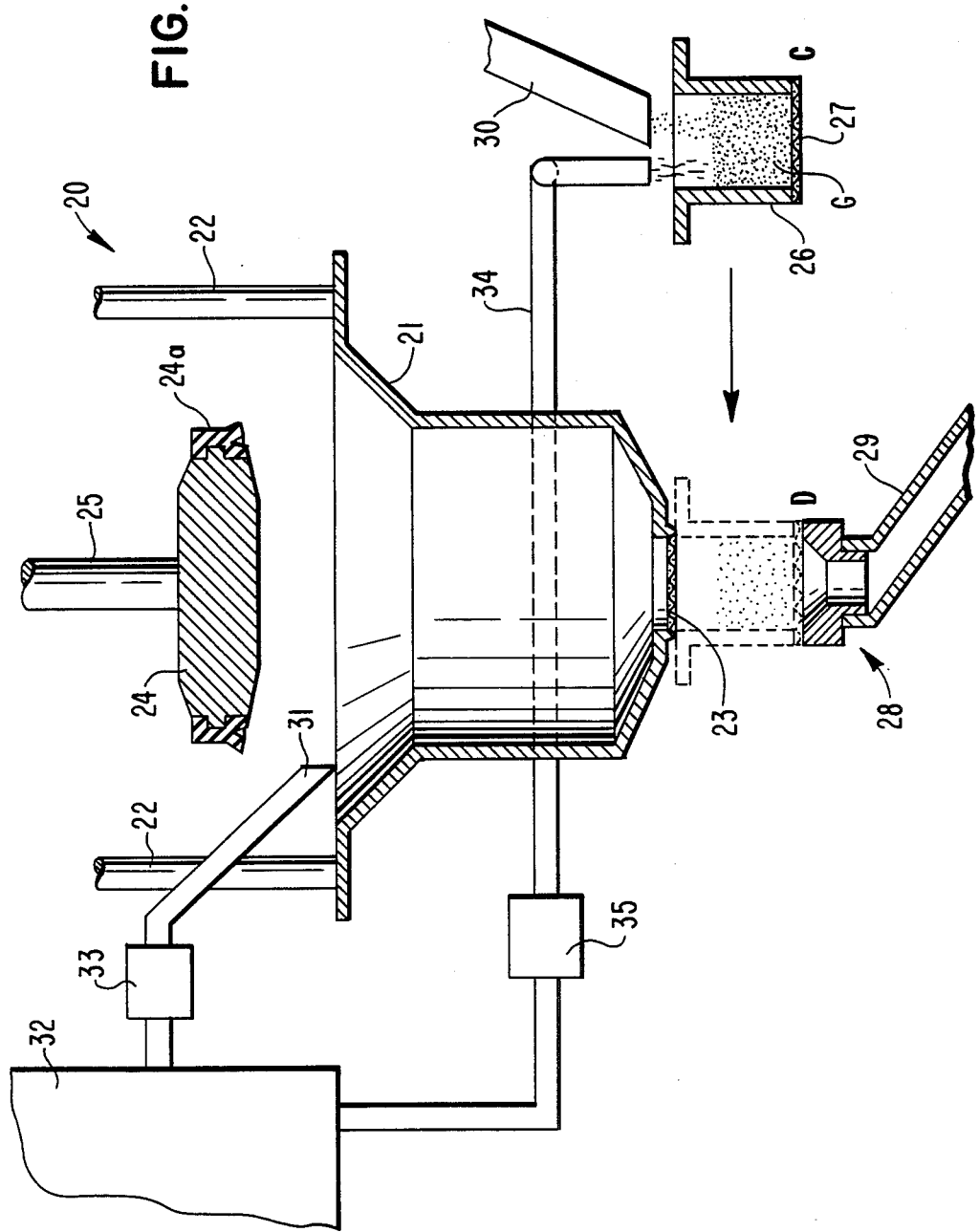
FIG. 3 is a diagramatic view of a brewing apparatus according to one embodiment of this invention.

Referring to FIG. 3, a brewing apparatus 20 in accordance with this invention and particularly the main portion for the brewing operation is shown. Apparatus 20 includes a cylinder 21 which is vertically movable as supported on a frame (see FIG. 1) through a pair of rods 22. Cylinder 21 has an open top and an open bottom. A mesh screen member 23 is disposed across the open bottom of cylinder 21 to prevent the intrusion of dust. A piston 24 is vertically movable as supported on the frame through rod 25. Piston 24 is reciprocably disposed to move down within cylinder 21. A sealing element 24a is disposed around the outer peripheral surface of piston 24 to provide sealing between the outer peripheral surface of piston 24 and the inner surface of cylinder 21.

A brewing cavity 26 is mounted to be horizontally movable so cavity 26 can be disposed beneath cylinder 21 and be moved between a brewing position D and a rest position A, as was mentioned above with reference to FIG. 1. A filter element 27 is removably disposed beneath the brewing cavity 26 to move between brewing position D and a ground material supply position C, such filter element preventing the ground material from dropping out through the open bottom of cavity 26.

A drain structure 28 is mounted on the frame (see FIG. 1) positioned directly beneath and in axial alignment with the open bottom of cylinder 21. The drain structure 28 is provided with an outlet duct 29 communicating with the conduct leading to the dispensing station on which a cup is placed prior to initiation of brewing cycle. This permits the brewing apparatus to have a compact size for a vending machine or the like.

Figure 5:
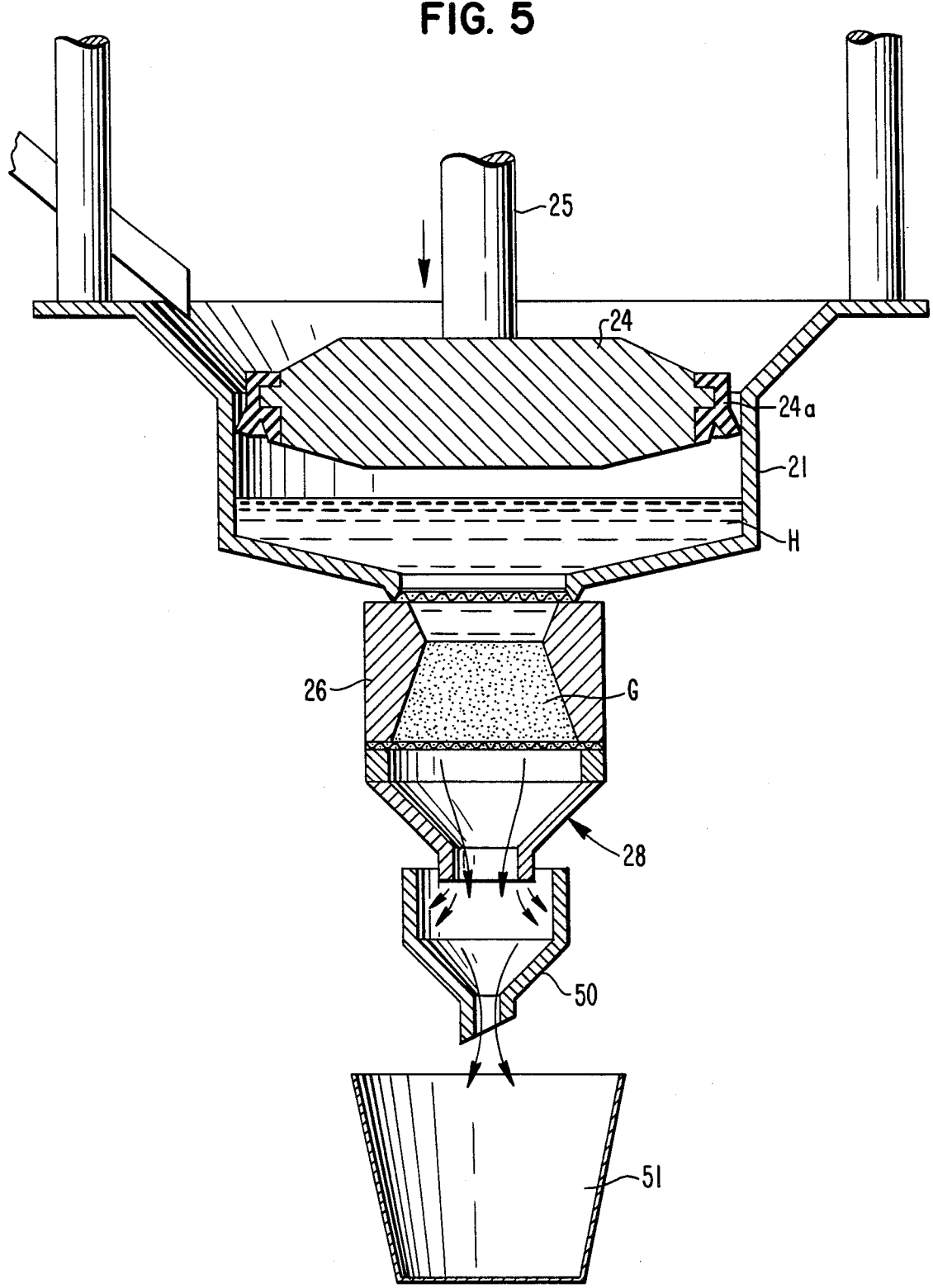
FIG. 5 is a sectional view of a main portion of another brewing apparatus according to this invention showing a liquid scatter prevention device.

If drain structure 28 is constructed to open directly into the upper portion of a cup 51 which is placed on a depositing place directly below drain structure 28, the compressed air passed through the brewing cavity 26 is suddenly expanded through the open bottom of drain structure 28. Thereupon, drops of brewing liquid are splashed by the compressed air resulting in the soiling of the interior of the depositing place, including cup 51. To resolve this problem, a funnel 50 as shown in FIG. 5 is disposed beneath the drain structure 28 for collecting the splashed out liquid and guiding it to the cup 51.

One end of hopper 30, as shown in FIG. 3, opens slightly above the position of brewing cavity 26 when such cavity is positioned at the ground beverage material supply position C to supply a predetermined quantity of ground coffee G into cavity 26. A predetermined quantity of ground coffee is supplied, controlled by the operation of feed means in a canister (not shown) which is filled with ground coffee.

A water supply spout 31 connected with a hot water supply tank 32 is located slightly above cylinder 21 to supply the necessary volume of hot water into the cylinder 21. The timing of the supply of hot water into cylinder 21 and volume of supply of hot water are controlled by an electromagnetic valve 33. A second water supply spout 34 which is also connected with hot water supply tank 32 is located slightly above brewing cavity 26 generally parallel with the open end of hopper 30, this spout serving to supply a predetermined quantity of hot water into cavity 26 when the cavity is disposed at the beverage mateial supply position C. The timing for supplying the hot water into brewing cavity 26 through spout 34 and quantity of hot water supplied is controlled by a second electromagnetic valve 35.

The basic beverage extraction cycle includes introducing a predetermined quantity of ground coffee G through hopper 30 into brewing cavity 26 which is moved from the rest position to position C. At this point in time, a predetermined quantity of hot water is also supplied into brewing cavity 26 through the second hot water supply spout 34. This quantity of hot water should be sufficient to only moisten the supplied ground coffee in cavity 26 and not of such a quantity that water will exit from the open bottom of brewing cavity 26. Thus, the hot water at this point only functions to moisten and steam the ground coffee.

After, the ground coffee and the hot water are supplied into brewing cavity 26 at position C, the brewing cavity 26 is moved to be positioned beneath cylinder 21. During passage from the material supply position C to brewing position D, a predetermined quantity of hot water is supplied into cylinder 21 through hot water supply spout 31. When brewing cavity 26 is positioned at brewing position D, cylinder 21 is moved downwardly to come into contact with the open top of brewing cavity 26 and then piston 24 moves downwardly into cylinder 21. During the downward movement of piston 24, seal element 24a contacts with the inner surface of cylinder 21 to define a sealed chamber withihn cylinder 21. Therefore, downward movement of piston 24 creates pressure forcing the hot water outwardly toward brewing cavity 26, the water passing through screen member 23. The hot water pushed out of cylinder 21 is passed through the ground coffee G in brewing cavity 26 and then liquid coffee is extracted from cavity 26. The extracted coffee is delivered to a cup placed beneath dispensing end 29 of drain structure 28 or through funnel 50 into cup 51 as shown on FIG. 5.

Figure 1:
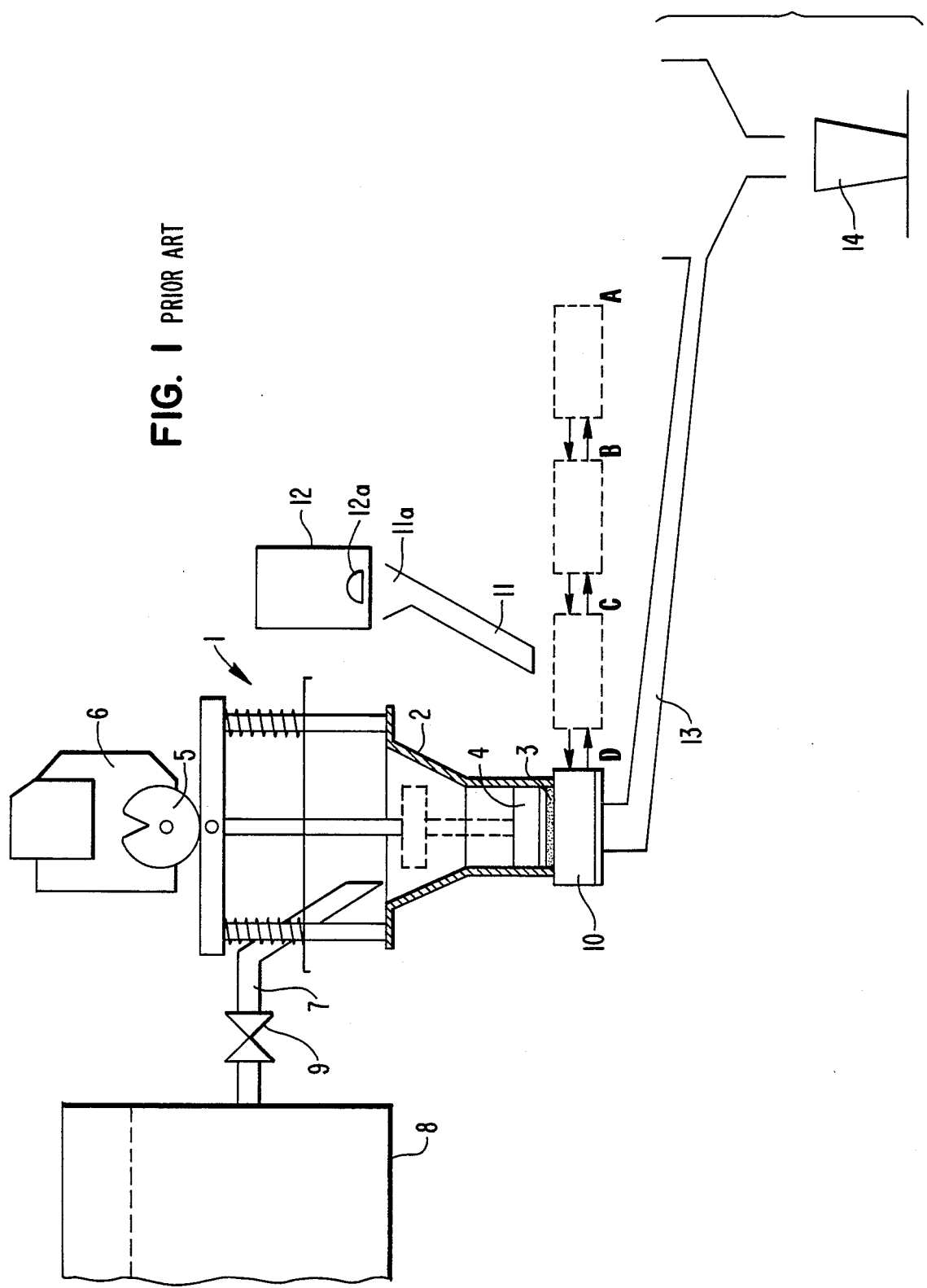
FIG. 1 is a diagramatic view of a prior art brewing apparatus to illustrate the basic construction and brewing cycle.
Figure 2A:
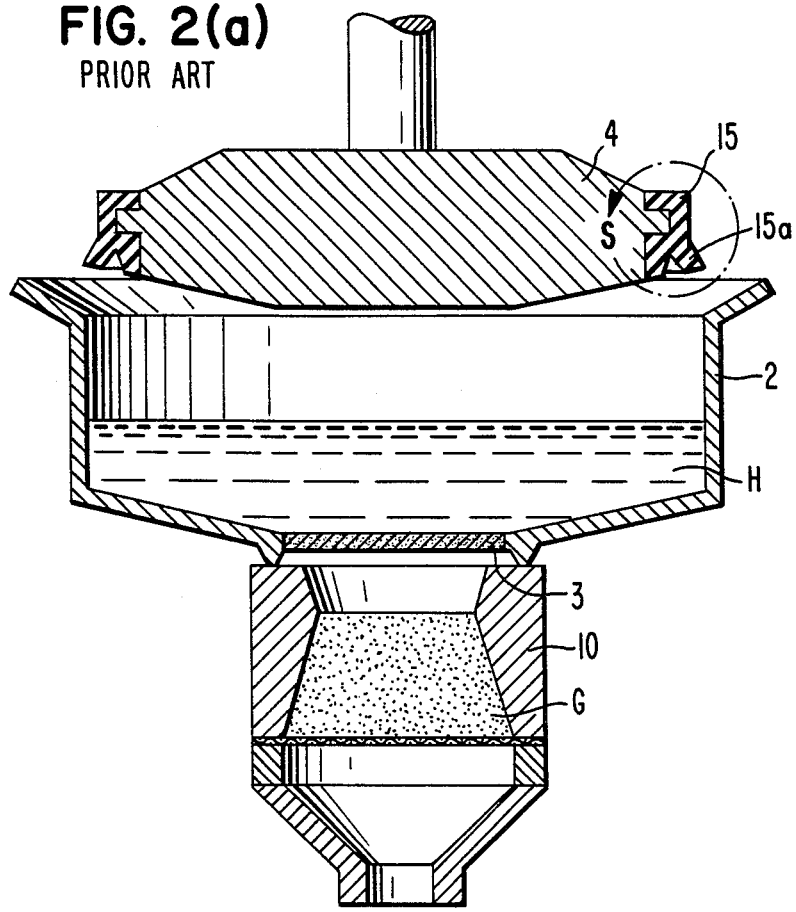
FIG. 2 is a schematic sectional view of a main portion of FIG. 1.
FIG. 2b is an enlarged view of portion S encircled on FIG. 2.
Figure 2B:
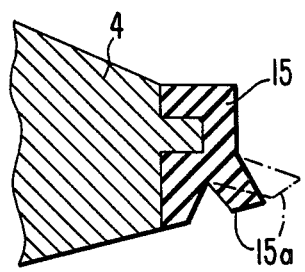

When piston 24 reaches its bottom position within cylinder 21, both piston 24 and cylinder 21 elevate simultaneouly for a short distance to clear the top of brewing cavity 26. Thereafter, brewing cavity 26 and filter element 27 move simultaneouly to the right in FIG. 3 to be positioned at the rest position A, passing through the ground dumping position B (FIG. 1). The filter element 27 is moved a limited distance from the bottom of cavity 26 to empty the spent ground coffee at the ground dumping position B. When brewing cavity 26 reaches rest position A, one cycle of a brewing operation is finished.

As mentioned above, the ground coffee is steamed and moistened by the hot water prior to the coffee extracting operation. Therefore, brewing extracting efficiency is improved without extending the brewing extraction time.

Figure 4:
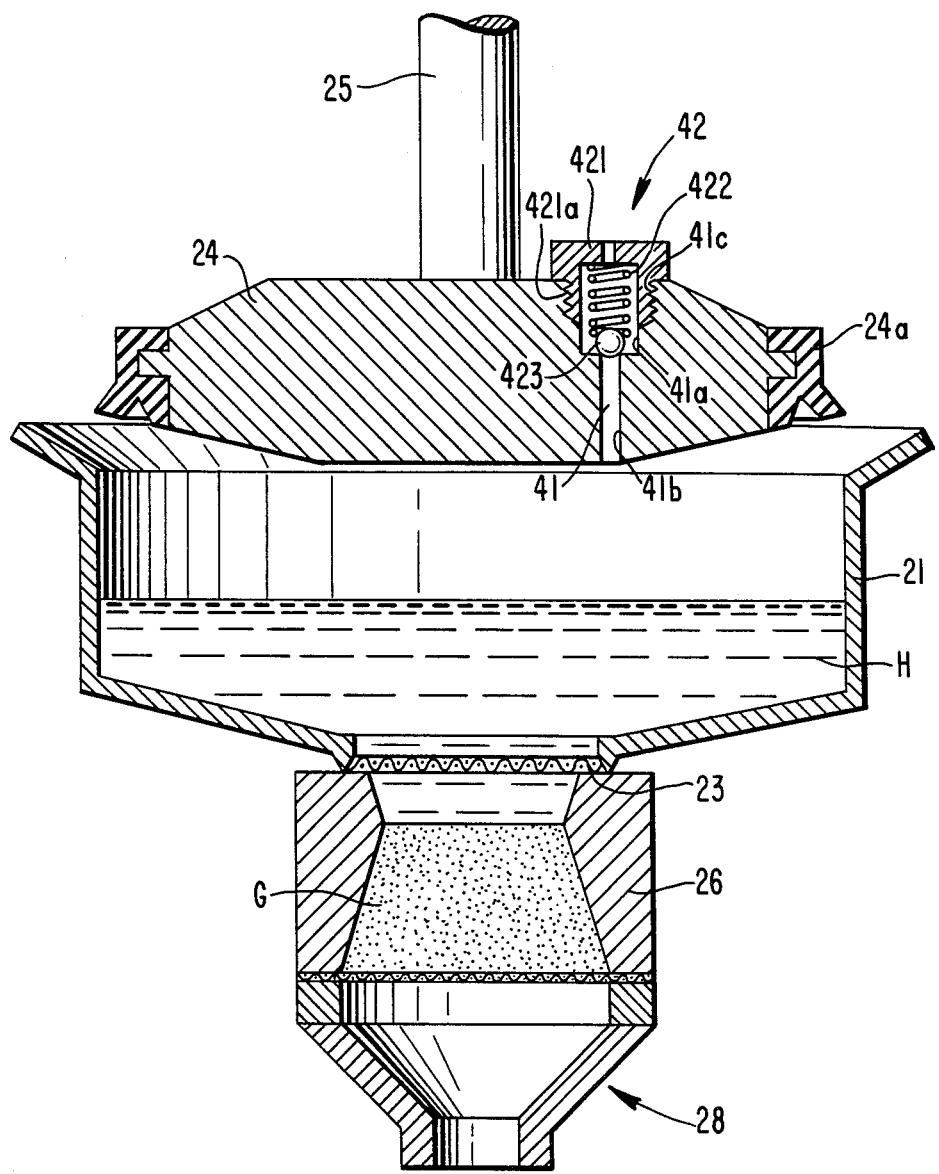
FIG. 4 is a sectional view of a main portion of a brewing apparatus according to this invention showing an air pressure relief device.

The pressure within the sealed chamber in cylinder 21 is rapidly increased due to downward movement of piston 24. Therefore, as shown in FIG. 4, piston 24 is provided with an air pressure release device to release compressed air from within the sealed chamber in cylinder 21. This release device includes an air passageway 41 which is formed vertically through piston 24 and comprises an upper large diameter portion 41a and lower small diameter portion 41b, and an air release means 42.

Air release means 42 comprises a valve retainer 421 screwed onto the upper opening of large diameter portion 41a, a coil spring 422 disposed with large diameter portion 41a of passageway 41 and a ball valve 423 located at the opening of smaller diameter portion 41b. Valve retainer 421 has a threaded portion 421a screwed into a threaded portion 41c formed in the upper portion of large diameter portion 41a and seated on the connection between the interior of large diameter portion 41a and exterior of the piston 24. The coil spring 422 is located between valve retainer 421 and ball valve 423 to press the ball valve 423 against the opening of the small diameter portion 41b to close passageway 41.

Therefore, when pressure in the small diameter portion 41b, i.e., pressure in the sealed chamber of chamber 21, exceeds the biasing strength of coil spring 422, ball valve 423 is displaced from its closing position over the opening of small diameter portion 41b. Thus pressure in the sealed chamber is reduced until the pressure in the sealed chamber is balanced by the biasing strength of coil spring 422. In this invention, the pressure in sealing chamber would be held at 1.51 kg/cm$^2$.

As mentioned above, during downward movement of piston 24 to force the hot water out of cylinder 21, if pressure in the sealed chamber exceeds the predetermined setting for the air release means 42, the pressure in sealed chamber is reduced by operation of the air being released. Therefore, some problems which might be caused by over pressure in the chamber of cylinder 21 are resolved.

The present invention has been described in detail in connection with preferred embodiments, but these are examples only and the invention is not restricted thereto. It will be easily understood by those skilled in the art that other variations and modifications can be easily made within the scope of the invention.

We claim:

1. In a brewing apparatus including a vertically movable cylinder having an open top and open bottom, a piston mounted for reciprocation down into said cylinder, brewing liquid supply means having a discharge opening positioned to discharge brewing liquid into the open top of said cylinder, a liquid heating tank connected with said liquid supply means, a brewing cavity reciprocable horizontally between a brewing position and a rest position, said cavity being tightly engaged with the open bottom of said cylinder when disposed in said brewing position, and ground beverage material supply means having a delivery opening positioned to supply ground material into said brewing cavity when said cavity is disposed at a material supplying position, the improvement comprising second liquid supply means including a liquid supply duct having a discharge opening positioned to discharge liquid into said brewing cavity when said cavity is disposed at said material supplying position, said liquid supplying duct being connected with said liquid heating tank, and an electromagnetic valve in said duct to control the liquid supply operation of said second liquid supply means.

2. The brewing apparatus of claim 1 wherein said piston is provided with an air pressure release device to release compressed air from within said cylinder.

3. The brewing apparatus of claim 2 werein said air pressure release device comprises an air passageway formed through said piston to communicate between the interior of said cylinder and a relief valve device to control the opening and closing of said air passageway dependent on the pressure in the interior of said cylinder.

4. The brewing apparatus of claim 2 further comprising a drain structure disposed beneath the open bottom of said cylinder for collecting and delivering the brewing liquid to a cup, said structure including a funnel element placed beneath the lower portion of the open bottom of said drain structure to prevent the scattering of brewing liquid.

5. In a brewing apparatus including a vertically movable cylinder having an open top and an open bottom, a piston mounted for reciprocation down into said cylinder, a seal member disposed around the outer peripheral surface of said piston to provide sealing between said cylinder and said piston to form a sealed chamber in said cylinder, brewing liquid supply means having a discharge opening positioned to discharge brewing liquid into the open top of said cylinder, a liquid heating tank connected with said liquid supply means, a brewing cavity reciprocable horizontally between a brewing position and a rest position, said cavity being tightly engaged with the open bottom of said cylinder when disposed in said brewing position, and ground beverage material supply means having a delivery opening positioned to supply ground material into said brewing cavity when said brewing cavity is disposed at a ground material supplying position, the improvement comprising said piston being provided with an air pressure release device to release compressed air from the interior of said cylinder for preventing excess pressure within the interior of said cylinder.

6. The brewing apparatus of claim 5 wherein said air pressure release device comprises an air passageway formed through said piston and a relief valve device to control the opening and closing of said air passageway.

* * * * *